March 31, 1953 G. J. OKULITCH ET AL 2,633,339
IMMERSION TYPE AGITATOR AND THE LIKE
Filed March 13, 1952 2 SHEETS—SHEET 1
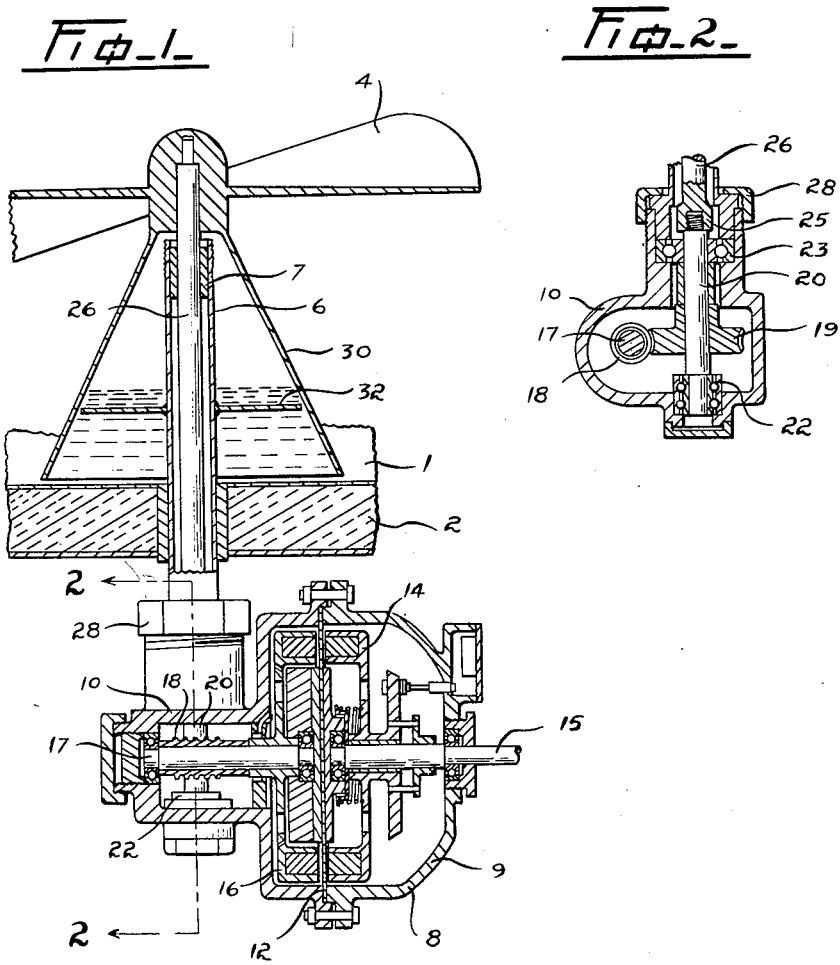
INVENTORS
GEORGE J. OKULITCH
IGOR V. ZOZULIN
Ernest E. Carver
ATTORNEY

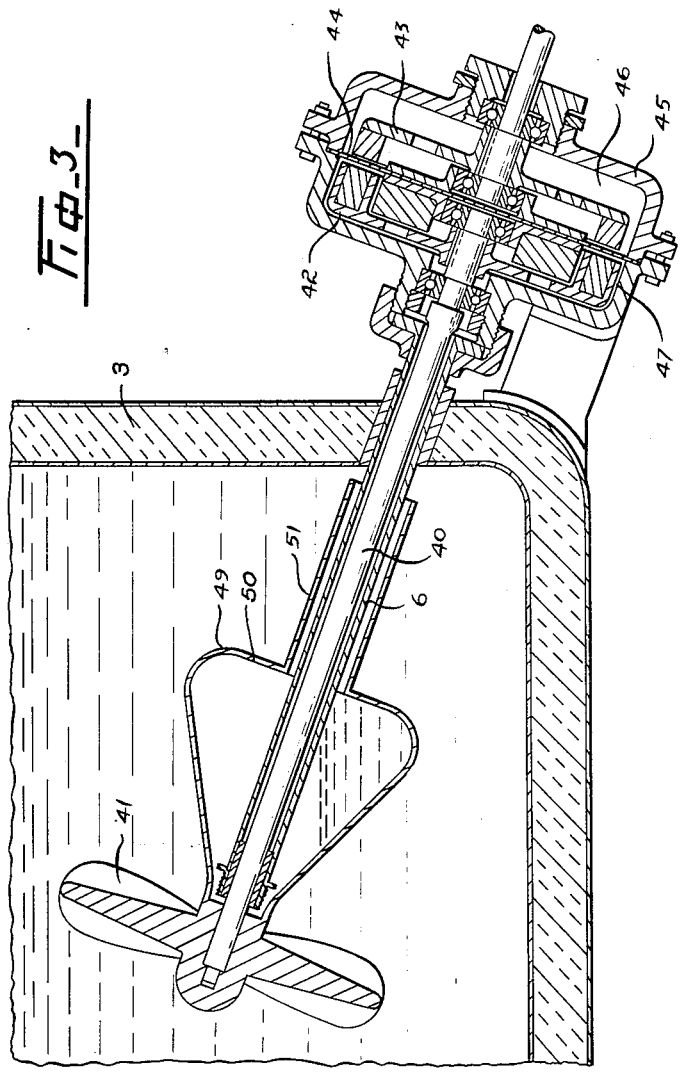

Patented Mar. 31, 1953

2,633,339

UNITED STATES PATENT OFFICE 2,633,339

IMMERSION TYPE AGITATOR AND THE LIKE

George J. Okulitch and Igor V. Zozulin, Vancouver, British Columbia, Canada

Application March 13, 1952, Serial No. 276,354

5 Claims. (Cl. 259—106)

Our invention relates to improvements in immersion type agitators and the like.

The conventional fluid agitator operating within a tank or vessel and being driven by an external motor through a magnetic clutch while being effective in operation still presents objectionable features or difficulties. Amongst the objections are that the fluid may contact parts of the magnetic clutch or other drive or driven parts, which are not well situated for easy cleaning; corrosion may occur to parts which are not easily cleaned through contact with the fluid of the tank; difficulty in maintaining a seal of running parts under vacuum or pressure; the necessity of sealing the magnets to prevent drag, and the necessity of greater size magnets to compensate for loss through drag in the fluid. When it is desired to install an agitator as above described to an alreay installed tank, the situation is difficult since it is necessary with the conventional agitator to cut an opening in a side wall of the tank of the size of the diaphragm used between the rotors of the magnets.

The present design overcomes all of these objections and possesses advantages which will be apparent as the specification proceeds.

Referring to the accompanying drawings:

Figure 1 is a sectional view of the invention as designed to be operated through the bottom wall of a tank.

Figure 2 is a sectional view taken on the line 2—2 of Figure 1.

Figure 3 is a sectional view of a modified form of the invention wherein the driven shaft projects through a side wall of the tank and is inclined.

In the drawings like characters of reference indicate corresponding parts in each figure.

The numeral 1 indicates a lower portion of a tank or vat having a bottom wall 2 and side wall 3 shown only in Figure 3. The tank 1 is adapted to be partly filled with liquid which is to be agitated by a rotatory member 4 of any suitable type. An opening is formed in the bottom wall 2 of the tank and is fitted with a vertical tube or sleeve 6, see Figure 1, having an internal bearing 7 at its upper end. Below the sleeve 6 a housing 8 is appropriately supported, which housing is divided into a magnetic clutch casing 9 and a reducing gear casing 10. The clutch casing 9 is divided transversely by a diaphragm 12 which separates a drive rotor 14 upon a primary shaft 15 from a driven rotor 16 upon a driven shaft 17. Both of the rotors 14 and 16 are provided with opposing annular rings of magnets so that as the shaft 15 is turned, non-positive rotation is imparted from the rotor 14 to the rotor 16. The driven shaft 17 is fitted with a worm 18 which imparts rotation to a worm wheel 19 upon a vertical shaft 20. The vertical shaft 19 is stepped in a bearing 22 and extends upwardly through a bearing 23 and is coupled as at 25 to an aligned shaft 26. The casing 10 is connected to the vertical sleeve 6 by a coupling nut 28 or any other suitable means.

The member 4, which in the instance shown, is an agitator, is fitted to the upper end of the shaft 26 in such a manner that it may be lifted off said shaft to facilitate cleaning and without the need for tools. Attached to the agitator 4 is a conical bell 30 having a volumetric capacity which is substantially equal to the voids in the casing 10 and the adjacent portion of the casing 9 back to the diaphragm 12, so that as liquid is filled into the tank 1 air will become compressed in the top of the bell and into the spaces in casings 9 and 10 as above described and will prevent the liquid from rising into the sleeve and passing down to touch the gear train parts 17, 18 and 19, the rotor 16 or the diaphragm 12.

The tubular sleeve may be provided with a horizontal baffle 32 reaching radially close to the inner periphery of the bell 30, so that in case of liquid falling into the tank and splashing upwards inside the bell, none of said liquid may reach the upper end of the sleeve 6 or enter it. The bell 30 will preferably be integral with and removable with the agitator, so that every portion of the structure normally covered by the conical bell, also the bell and the agitator may be easily removed and cleansed after use.

In the example shown in Figure 3, the tubular sleeve 6 is inclined and is fitted with a driven shaft 40 having an agitator 41 at its upper end and is connected to the driven magnetic rotor 42 of a magnetic clutch 43. The clutch 43 is provided as in the preferred form of the invention with a diaphragm 44 which divides the clutch housing 45 into two separate casings 46 and 47. Integral with the agitator 41 is a conical air chamber 49 having an intermediate wall 50 at its lower end and a sleeve 51 extending from said lower end and normally surrounding the sleeve 6 of Figure 3. The operation of this conical air chamber is as previously described and the air compression set up in the conical air chamber will be always equal to that of the static head of liquid within the tank and its volumetric capacity will be such that no liquid will be able to reach the end of the driven shaft 40 or the interior of the tubular sleeve 6 or the casing 47.

What we claim as our invention is:

1. In an agitating device adapted to be driven in immersed position within a tank by an exteriorly mounted magnetic clutch, a sleeve extending in an upward direction through a wall of the tank, a housing connected with the sleeve, said housing being divided by a diaphragm into two casings, a shaft extending from one of the casings through the sleeve, a magnetically driven rotor within said casing, said rotor being operatively connected to the shaft to rotate it, a bell mounted upon the upper end of the shaft and extending downward to cover a substantial portion of the sleeve, an agitator on the upper end of the bell, said bell having a volumetric capacity sufficient to prevent fluid pressure in the tank from forcing some of the tank fluid over the top of the sleeve to flow towards the magnetic clutch, said bell and agitator being entirely disposed below the normal level of fluid in the tank.

2. In an agitating device adapted to be driven in immersed position within a tank by an exteriorly mounted magnetic clutch, a shaft extending upwardly through a wall in the tank, a sleeve enclosing the lower part of the shaft, a housing in communication with the sleeve, said housing having a dividing wall to define a working space within said housing, a clutch member within the space operatively connected with the shaft, a bell having an agitator on its upper end, said bell being removably connected to the upper end of the shaft to be driven thereby, said bell having a volumetric capacity at least equal to that of the sleeve and the working space whereby to prevent static pressure in the tank from forcing liquid into the sleeve, and a baffle carried by the sleeve, said baffle extending into close proximity with the inner periphery of the bell.

3. In an agitating device adapted to be driven in immersed position within a tank by an exteriorly mounted magnetic clutch, a shaft extending upwardly through a wall in the tank, a sleeve enclosing the lower part of the shaft, a housing in communication with the sleeve, said housing having a dividing wall to define a working space within said housing, a clutch member within the space operatively connected with the shaft, a bell removably connected to the upper end of the shaft to be driven thereby, said bell having a pipe extending downwardly therefrom and extending along the sleeve.

4. In an agitating device adapted to be driven in immersed position within a tank by an exteriorly mounted magnetic clutch, a shaft extending upwardly through a wall in the tank, a sleeve enclosing the lower part of the shaft, a housing in communication with the sleeve, said housing having a dividing wall to define a working space within said housing, a clutch member within the space operatively connected with the shaft, a bell removably connected to the upper end of the shaft to be driven thereby, said bell having a wall at its lower end turning inwardly into close proximity to the sleeve.

5. In an agitating device as claimed in claim 5 and a pipe extending from the wall downwardly along the sleeve.

GEORGE J. OKULITCH.
IGOR V. ZOZULIN.

REFERENCES CITED

The following references are of record in the file of this patent:

UNITED STATES PATENTS

| Number | Name | Date |
| --- | --- | --- |
| 1,219,491 | Santicola | Mar. 20, 1917 |
| 1,783,380 | Kirby | Dec. 2, 1930 |
| 2,556,854 | Spears et al. | June 2, 1951 |
| 2,566,743 | Okulitch et al. | Sept. 4, 1951 |